United States Patent
Liu et al.

(10) Patent No.: US 9,711,774 B2
(45) Date of Patent: Jul. 18, 2017

(54) LITHIUM ION BATTERY WITH THERMAL SENSITIVE LAYER

(71) Applicant: Nano and Advanced Materials Institute Limited, Hong Kong (HK)

(72) Inventors: Chenmin Liu, Hong Kong (HK); Yeming Xu, Hong Kong (HK); Chi Ho Kwok, Hong Kong (HK); Ning Tu, Hong Kong (HK)

(73) Assignee: NANO AND ADVANCED MATERIALS INSTITUTE LIMITED, Hong Kong (HK)

( * ) Notice: Subject to any disclaimer, the term of this patent is extended or adjusted under 35 U.S.C. 154(b) by 0 days.

(21) Appl. No.: 14/957,611

(22) Filed: Dec. 3, 2015

(65) Prior Publication Data
US 2016/0164065 A1 Jun. 9, 2016

Related U.S. Application Data
(60) Provisional application No. 62/123,920, filed on Dec. 3, 2014.

(51) Int. Cl.
| | | |
|---|---|---|
| *H01M 2/16* | (2006.01) | |
| *H01M 2/34* | (2006.01) | |
| *H01M 10/0525* | (2010.01) | |
| *H01M 2/14* | (2006.01) | |

(52) U.S. Cl.
CPC ......... *H01M 2/1686* (2013.01); *H01M 2/145* (2013.01); *H01M 2/1653* (2013.01); *H01M 2/1673* (2013.01); *H01M 10/0525* (2013.01); *H01M 2200/10* (2013.01)

(58) Field of Classification Search
CPC .. H01M 2/145; H01M 2/1653; H01M 2/1673; H01M 2/1686; H01M 10/0525; H01M 2200/10
See application file for complete search history.

(56) References Cited

U.S. PATENT DOCUMENTS

| | | | | |
|---|---|---|---|---|
| 2010/0279173 A1* | 11/2010 | Hying | ................... | H01M 2/162 429/247 |
| 2013/0171484 A1* | 7/2013 | Baginska | ............ | H01M 10/056 429/62 |

FOREIGN PATENT DOCUMENTS

| | | |
|---|---|---|
| CN | 103059613 A | 4/2013 |
| CN | 203218404 U | 9/2013 |

\* cited by examiner

*Primary Examiner* — Brittany Raymond

(57) ABSTRACT

The present application provides a lithium ion battery including a thermal sensitive layer comprising polymer particles. The thermal sensitive layer may be disposed between the electrodes and the separator. When the lithium ion battery is under thermal runaway condition and the internal temperature rises to a critical temperature, the polymer particles undergo a thermal transition process (melting) to form an insulating barrier on the electrodes, which blocks lithium ion transfer between the electrodes and shuts down the internal current of the battery.

20 Claims, 2 Drawing Sheets

LITHIUM ION BATTERY WITH THERMAL SENSITIVE LAYER

CROSS-REFERENCE TO RELATED APPLICATIONS

This application claims the benefit of U.S. Provisional Patent Application No. 62/123,920, filed on Dec. 3, 2014, the entire content of which is hereby incorporated by reference.

FIELD OF THE TECHNOLOGY

The present application relates to a lithium ion battery, in particular, with a thermal sensitive layer for shutdown of the battery at a predetermined temperature.

BACKGROUND

Lithium ion batteries are usually designed with a pressure-limited valve and equipped with an external positive temperature coefficient (PTC) resistor on crust. However, these external devices may not be able to respond when hazardous reactions happen at very high rate.

There are several mechanisms to improve the safety of lithium ion battery under thermal runaway condition, such as thermal fuses, PTC materials as external or internal fuses and shutdown separators. However, none of them can achieve automatic shutdown of lithium ion batteries at a predetermined temperature.

Shutdown separators are designed to perform thermally-induced shutdown of lithium ion batteries, and typically have a polyethylene(PE)-polypropylene(PP) bilayer or a PP-PE-PP trilayer structure. Above a critical temperature, the porous PE layer softens, collapsing the film pores and preventing ionic conduction, while the PP layer provides mechanical support. However, when the internal cell temperature rises to the softening temperature of the separator, the separator shrinks because of residual stresses induced during stretching of the separator films and the difference in density between the crystalline and amorphous phases of the separator materials, which will cause failure of the separator and expose the electrodes to internal shorting.

Therefore, there is a need to improve safety of lithium ion batteries.

SUMMARY

The present application is directed to a lithium ion battery including a cathode, an anode, a separator placed between the cathode and the anode, and a thermal sensitive layer, wherein the thermal sensitive layer includes polymer particles and is disposed between the separator and at least one of the cathode and the anode.

In an embodiment of the present application, the polymer particles may have an average size in the range of about 0.01 μm to about 40 μm. In a particular embodiment of the present application, the polymer particles may have an average size preferably in the range of about 0.5 μm to about 5 μm.

In an embodiment of the present application, the polymer particles may melt and shut down the battery at a temperature ranging from about 80° C. to about 260° C. In a particular embodiment of the present application, the polymer particles may melt and shut down the battery at a temperature ranging from about 100° C. to about 180° C.

The polymer particles may be made from one or more polymers selected from the group consisting of polystyrene (PS), polyethylene (PE), poly(methyl methacrylate) (PMMA), acrylonitrile butadiene styrene (ABS), polylactic acid, polyvinyl chloride (PVC), polyvinyl butyral (PVB), and any combinations thereof. In a particular embodiment of the present application, the polymer particles may be made from PS or PE.

The thermal sensitive layer may be disposed on at least one of the surfaces of the cathode, the anode, and the separator.

The thermal sensitive layer may be disposed by coating a dispersion including the polymer particles and a solvent on at least one of the surfaces of the cathode, the anode, and the separator. In some embodiments of the present application, the thermal sensitive layer may be disposed by wet coating or spraying. In a particular embodiment of the present application, the thermal sensitive layer is disposed by spin coating or blade coating.

The polymer particles may be dispersed in the solvent at a weight concentration of about 1% to about 10%.

The solvent may be selected from the group consisting of methanol, ethanol, acetone, N-methyl-2-pyrrolidone (NMP), and any combinations thereof.

In an embodiment of the present application, the thermal sensitive layer may have a thickness of about 0.1 μm to about 50 μm. In a particular embodiment of the present application, the thermal sensitive layer may have a thickness of about 0.5 μm to about 5 μm.

The thermal sensitive layer may further include a binder. The binder may be selected from the group consisting of polyvinylidene fluoride (PVDF), polyurethane, polyethylene oxide, poly acrylic acid, carboxymethyl cellulose, polyacrylonitrile, polymethylacrylate, polyacrylamide, polyvinylacetate, polyvinyl butyral, polyvinylpyrrolidone, polyvinyl alcohol polytetrafluoroethylene, glycol diacrylate, hexafluoropropylene (HEP), chlorotetrafluoroethylene (CTFE), and any combinations thereof.

The binder may be about 0% to about 50% by weight. The polymer particles may be about 50% to about 100% by weight.

The separator may be a non-woven separator or a polypropylene/polyethylene/polypropylene trilayer separator.

Although the lithium ion battery is shown and described with respect to certain embodiments, it is obvious that equivalents and modifications will occur to others skilled in the art upon the reading and understanding of the specification. The lithium ion battery in the present application includes all such equivalents and modifications, and is limited only by the scope of the claims.

BRIEF DESCRIPTION OF THE DRAWINGS

Specific embodiments of the lithium ion batteries will now be described by way of example with reference to the accompanying drawings wherein.

DETAILED DESCRIPTION

In the following detailed description, numerous specific details are described in order to provide a thorough understanding of the application. However the present application may be practiced without these specific details. In other instances, well known methods, procedures, components have not been described in detail so as not to obscure the present application. Further, exemplary sizes, values and ranges may be given, but it should be understood that the present application is not limited to these specific examples.

This present application provides a lithium ion battery including a thermal sensitive layer including polymer particles for shutdown of the battery. When the lithium ion battery is under thermal runaway condition and the internal temperature rises to a critical temperature, the polymer particles undergo thermal transition process (melting) to form an insulating barrier on the electrodes, which blocks lithium ion transfer between the electrodes and shuts down the internal current of the battery. The shutdown of current reduces further heat generation and prevents the lithium ion battery from exploding and firing.

The lithium ion battery of the present application may include a cathode, an anode, a separator placed between the cathode and the anode, and a thermal sensitive layer.

The thermal sensitive layer may include polymer particles having an average size in the range of about 0.01 µm to about 40 µm. Preferably, the polymer particle may have an average size in the range of about 0.5 µm to about 5 µm. Suitable polymer particles may melt at a temperature ranging from about 80° C. to about 260° C., preferably about 100° C. to about 180° C. In some embodiments of the present application, the polymer particles may be made of polystyrene (PS), polyethylene (PE), poly(methyl methacrylate) (PMMA), acrylonitrile butadiene styrene (ABS), polylactic acid, polyvinyl chloride (PVC) or polyvinyl butyral (PVB).

Figure 1:
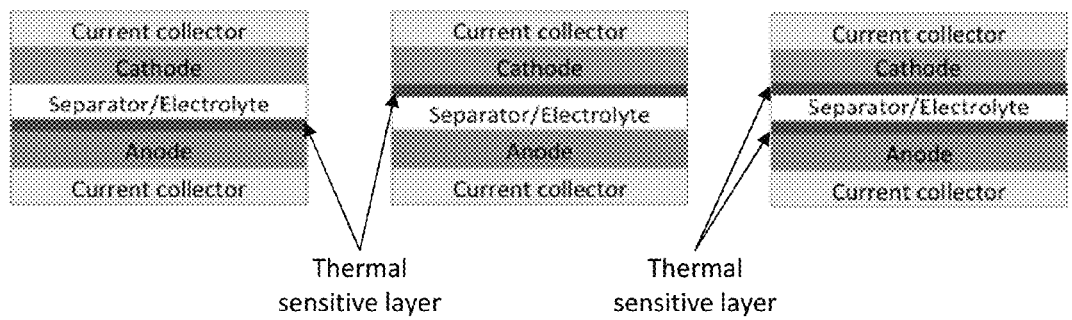
FIG. 1 illustrates the positions of the thermal sensitive layer according to the present application.

The thermal sensitive layer may be disposed strongly and uniformly on the surface of the electrodes or the separator of the battery. As shown in FIG. 1, the thermal sensitive layer may be disposed between the separator and at least one of the anode and the cathode.

The thermal sensitive layer may be prepared by dispersing the polymer particles in solvents to form dispersion. The dispersion may be wet coated or sprayed onto the surface of the electrodes or the separator using technologies commonly known in the art. Suitable wet coating technologies may include but not limited to spin coating and blade coating. Suitable solvent for preparing the polymer particle dispersion may include but not limited to methanol, ethanol, acetone and N-methyl-2-pyrrolidone (NMP). The polymer particles may be dispersed at a concentration of about 1 wt % to about 10 wt %. The thermal sensitive layer formed may have a thickness of about 0.1 µm to about 50 µm. Preferably, the thermal sensitive layer may have a thickness of about 0.5 µm to about 5 µm.

In some embodiments of the present application, binders may be added to the polymer particle dispersion to improve the adhesiveness of polymer particles on the electrodes or separator and thereby increase stability of the thermal sensitive layer under normal operation. Suitable binders may be those commercially available and commonly used in the art. Examples of suitable binders include polyvinylidene fluoride (PVDF), polyurethane, polyethylene oxide, poly acrylic acid, carboxymethyl cellulose, polyacrylonitrile, polymethylacrylate, polyacrylamide, polyvinylacetate, polyvinyl butyral, polyvinylpyrrolidone, polyvinyl alcohol polytetrafluoroethylene, glycol diacrylate, hexafluoropropylene (HEP), chlorotetrafluoroethylene (CTFE), and combinations thereof.

In some embodiments of the present application, the thermal sensitive layer may include about 50% to about 100% by weight of the polymer particles and about 0% to about 50% by weight of the binders.

Suitable electrodes and separators of the lithium ion battery according to the present application may be those commonly used and commercially available in the field of lithium ion batteries. Example of suitable separators may be non-woven separator and PP/PE/PP trilayer separator.

The polymer particles of the thermal sensitive layer are not involved in the charge-discharge reactions of the lithium ion battery. The thermal sensitive layer is thin enough to minimize the decrease in the energy density of the battery.

According to the present application, the polymer particles of the thermal sensitive layer undergo a thermal transition (melting) at a predetermined trigger temperature. The molten polymer particles form an insulating polymer-ceramic film on the electrode or the separator surface. Ionic conduction is completely blocked by in situ formation of the insulating barrier. The insulating film prevents lithium ion transfer between electrodes and shuts down the battery. Unlike commercial shutdown separators, which shrink when softening and have a risk of electrode shorting, the thermal layer of the present application ensures safe shutdown of the battery at high temperature.

The trigger temperature depends on properties of the thermal sensitive layer, including the material and the particle size of the polymer particles. The trigger temperature and shutdown rate of the battery may be tailored by using different polymer particles in order to optimize the shutdown response for specific battery designs. In some embodiments of the present application where the thermal sensitive layer is made of PS particles, the trigger temperature may be about 135° C. In some embodiments of the present application where the thermal sensitive layer is made of PE particles, the trigger temperature may be about 90° C.

Hereinafter the present application will be further illustrated by the following non-limitative examples.

EXAMPLE

Figure 2A:
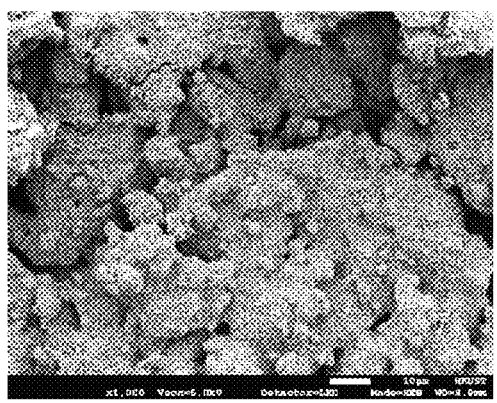
FIGS. 2a and 2b are SEM image of the PS particles coated on the anode and its close view of the particles, respectively.
Figure 2B:
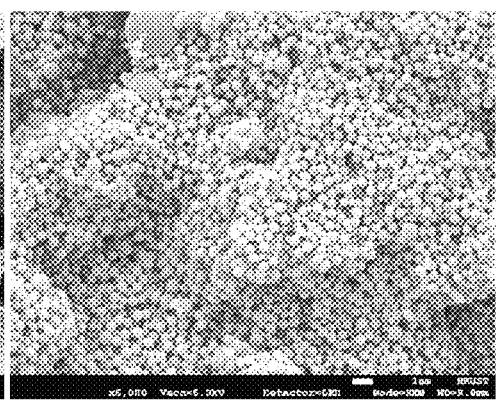

Polystyrene (PS) particles of 400 nm were dispersed in ethanol at a concentration of 1 wt %. The PS particle dispersion was coated on a graphite anode using a spray gun. FIGS. 2a and 2b are SEM image of the PS particles coated on the graphite anode and its close view of the particles. A uniform thermal sensitive layer of PS particles fully covering the anode was prepared. After coating the polymer particles, the coated anode, a lithium cobalt oxide cathode, a PP/PE/PP trilayer separator, and $LiPF_6$ (electrolyte) were used to fabricate a pouch cell in which the thermal sensitive layers were disposed between the electrodes and the separator. A control pouch cell was also fabricated in a similar way without polymer particle coating for comparison.

Figure 3A:
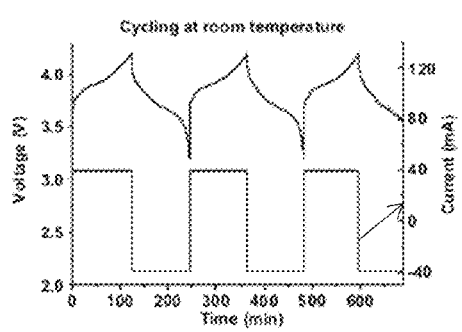
FIGS. 3a and 3b show the cycle performances of a PS-coated pouch cell according to one embodiment of the present application and a control pouch cell at room temperature, respectively.
Figure 3B:
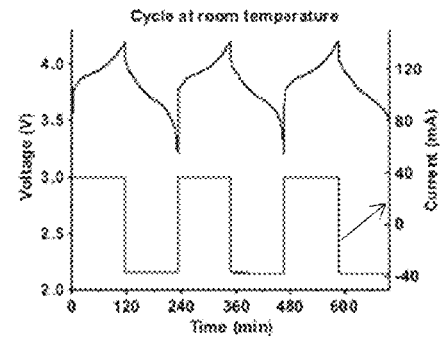
Figure 3C:
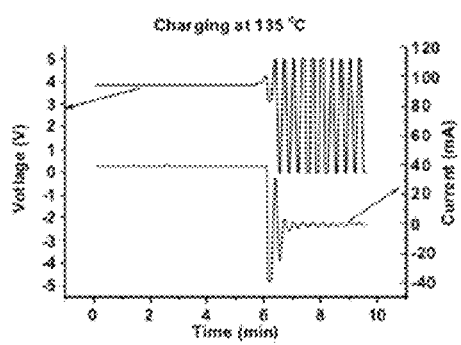
FIGS. 3c and 3d show the cycle performances of a PS-coated pouch cell according to one embodiment of the present application and a control pouch cell at 135° C., respectively.
Figure 3D:
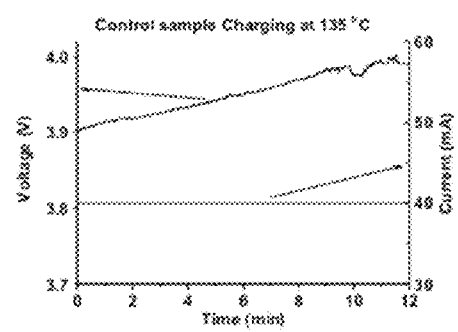

The pouch cells were first cycled at room temperature to verify cell performance. The voltages and currents of PS-coated pouch cell and control cell were monitored with time and their behaviors at room temperature were shown in FIGS. 3a and 3b. After several cycles at room temperature, both cells were put into a pre-heated oven at 135° C. The shutdown of PS-coated pouch cell was observed after several minutes of heating at 135° C. (FIG. 3c). After several minutes of heating, the resistance of PS-coated pouch cell increased drastically and the current was damped quickly to zero. The voltage was switched frequently between 0-5 V, which was the applied voltage range of the battery tester. The result indicates that, after heating at 135° C., the PS-coated pouch cell was shut down and no current passed through the cell. However, the control cell was still charging after 10 min heating (FIG. 3d) and no current change was observed.

Figure 4A:
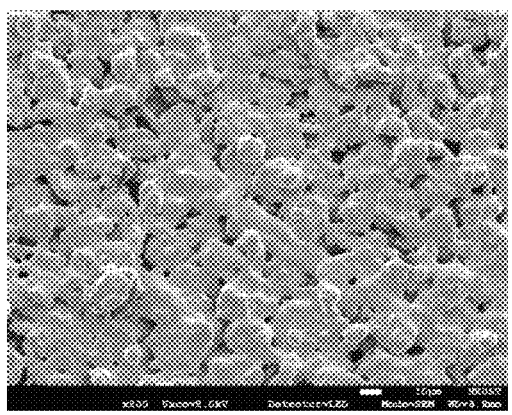
FIGS. 4a and 4b are SEM image of the PS film formed on the anode after heating at 135° C. and its close view of the particles, respectively.
Figure 4B:
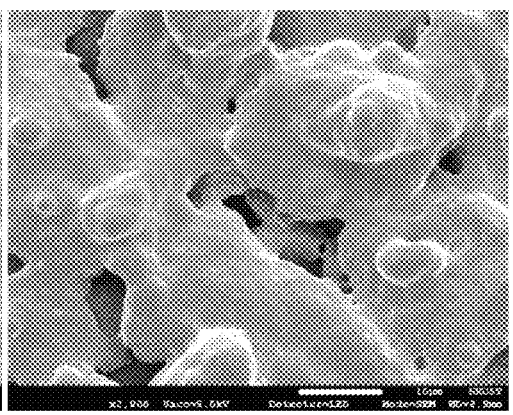

After cycling at 135° C., the PS-coated pouch cell was disassembled and the anode was isolated for SEM imaging. The SEM images in FIGS. 4a and 4b show a layer of PS film formed on the anode after heating at 135° C., which blocked Li ion transport between electrodes.

In order to verify the shutdown performance, impedances of the PS-coated cell and the control cell with two replicates were tested using Agilent impedance meter before cycling and after high temperature cycling (Table 1). The impedance data of the PS-coated cell indicated that there was no obvious increase after the anode was fully covered by PS particles. At the same time, the capacities of the PS-coated pouch cells were close to the control cells, with a difference of capacity below 5%. After cycling at 135° C., the PS-coated pouch cells were shut down and the impedances increased dramatically to infinity. In contrast, the impedances of control cells increased less than one order.

TABLE 1

| Cells | | Impedance (Ω) at 1 KHz at r.t. | Impedance (Ω) at 1 KHz after 135° C. heating | Capacity (mAh) at r.t. |
|---|---|---|---|---|
| Pouch cell using PS-coated anode | A | 0.55 | ∞ | 78.94 |
| | B | 0.58 | ∞ | 71.4 |
| Control cell | A | 0.49 | 2.15 | 76.2 |
| | B | 0.54 | 2.31 | 73.35 |

Certain features of the application have been described with reference to example embodiments. However, the description is not intended to be construed in a limiting sense. Various modifications of the example embodiments, as well as other embodiments of the application, which are apparent to persons skilled in the art to which the application pertains are deemed to lie within the spirit and scope of the application.

What is claimed is:

1. A lithium ion battery comprising a cathode, an anode, a separator placed between the cathode and the anode, and a thermal sensitive layer, wherein the thermal sensitive layer comprises polymer particles and is disposed between the separator and at least one of the cathode and the anode, wherein the polymer particles are about 50% to about 100% of the total weight of the thermal sensitive layer and the polymer particles are uniformly distributed and fully cover at least one of the surfaces of the cathode, the anode, and the separator.

2. The lithium ion battery of claim 1, wherein the polymer particles have an average size in the range of about 0.01 μm to about 40 μm.

3. The lithium ion battery of claim 2, wherein the polymer particles have an average size in the range of about 0.5 μm to about 5 μm.

4. The lithium ion battery of claim 1, wherein the polymer particles melt and shut down the battery at a temperature ranging from about 80° C. to about 260° C.

5. The lithium ion battery of claim 4, wherein the polymer particles melt and shut down the battery at a temperature ranging from about 100° C. to about 180° C.

6. The lithium ion battery of claim 1, wherein the polymer particles are made from one or more polymers selected from the group consisting of polystyrene (PS), polyethylene (PE), poly(methyl methacrylate) (PMMA), acrylonitrile butadiene styrene (ABS), polylactic acid, polyvinyl chloride (PVC), polyvinyl butyral (PVB), and any combinations thereof.

7. The lithium ion battery of claim 6, wherein the polymer particles are made from PS or PMMA.

8. The lithium ion battery of claim 1, wherein the thermal sensitive layer is disposed on at least one of the surfaces of the cathode, the anode, and the separator.

9. The lithium ion battery of claim 8, wherein the thermal sensitive layer is disposed by coating a dispersion comprising the polymer particles and a solvent on at least one of the surfaces of the cathode, the anode, and the separator.

10. The lithium ion battery of claim 9, wherein the thermal sensitive layer is disposed by wet coating or spraying.

11. The lithium ion battery of claim 9, wherein the thermal sensitive layer is disposed by spin coating or blade coating.

12. The lithium ion battery of claim 9, wherein the polymer particles are dispersed in the solvent at a weight concentration of about 1% to about 10%.

13. The lithium ion battery of claim 9, wherein the solvent is selected from the group consisting of methanol, ethanol, acetone, N-methyl-2-pyrrolidone (NMP), and any combinations thereof.

14. The lithium ion battery of claim 1, wherein the thermal sensitive layer has a thickness of about 0.1 μm to about 50 μm.

15. The lithium ion battery of claim 14, wherein the thermal sensitive layer has a thickness of about 0.5 μm to about 5 μm.

16. The lithium ion battery of claim 1, wherein the thermal sensitive layer further comprises a binder.

17. The lithium ion battery of claim 16, wherein the binder are selected from the group consisting of polyvinylidene fluoride (PVDF), polyurethane, polyethylene oxide, poly acrylic acid, carboxymethyl cellulose, polyacrylonitrile, polymethylacrylate, polyacrylamide, polyvinylacetate, polyvinyl butyral, polyvinylpyrrolidone, polyvinyl alcohol polytetrafluoroethylene, glycol diacrylate, hexafluoropropylene (HEP), chlorotetrafluoroethylene (CTFE), and any combinations thereof.

18. The lithium ion battery of claim 16, wherein the binder is no more than about 50% of the total weight of the thermal sensitive layer.

19. The lithium ion battery of claim 1, wherein the separator is a non-woven separator or a polypropylene/polyethylene/polypropylene trilayer separator.

20. The lithium ion battery of claim 1, wherein the polymer particles are about 100% of the total weight of the thermal sensitive layer.

* * * * *